（12） United States Patent
Huang

(10) Patent No.: US 6,772,030 B1
(45) Date of Patent: Aug. 3, 2004

(54) METHOD OF CONSIDERING EQUIPMENT CONSTRAINTS IN A MANUFACTURING PLANNING SYSTEM

(75) Inventor: Shu-Jen Huang, Hsin-Chu (TW)

(73) Assignee: Taiwan Semiconductor Mfg. Co., Ltd., Hsin-Chu (TW)

( * ) Notice: Subject to any disclaimer, the term of this patent is extended or adjusted under 35 U.S.C. 154(b) by 0 days.

(21) Appl. No.: 10/429,459

(22) Filed: May 5, 2003

(51) Int. Cl.⁷ .............................................. G06F 19/00
(52) U.S. Cl. ..................... 700/103; 700/99; 700/100; 700/106
(58) Field of Search .......................... 705/8, 7; 700/99, 700/100, 106, 107, 95

(56) References Cited

U.S. PATENT DOCUMENTS

| | | | |
|---|---|---|---|
| 5,826,040 A | * 10/1998 | Fargher et al. ................. | 705/8 |
| 5,880,960 A | 3/1999 | Lin et al. | |
| 6,088,626 A | * 7/2000 | Lilly et al. .................. | 700/100 |
| 6,459,946 B1 | * 10/2002 | Villanova et al. ........... | 700/111 |
| 6,546,300 B1 | * 4/2003 | Fukuda et al. | |
| 6,591,153 B2 | * 7/2003 | Crampton et al. ............ | 700/99 |

\* cited by examiner

Primary Examiner—Albert W. Paladini
(74) Attorney, Agent, or Firm—Duane Morris LLP

(57) ABSTRACT

A method of accounting for manufacturing resource re-entry constraints in a manufacturing planning system includes: building a relationship from a manufacturing operation to be rendered on lots of material, to a plurality of manufacturing resources capable of performing the operation, wherein at least one of the manufacturing resources is also capable of performing the operation on ones of the lots having manufacturing resource re-entry constraints; selecting one of the lots of material; selecting from any of the plurality of manufacturing resources in the relationship a manufacturing resource for performing the operation if the selected lot of material has no manufacturing resource re-entry constraints; and selecting from any of the at least one manufacturing resources in the relationship a manufacturing resource for performing the operation if the selected lot of material has manufacturing resource re-entry constraints.

8 Claims, 4 Drawing Sheets

METHOD OF CONSIDERING EQUIPMENT CONSTRAINTS IN A MANUFACTURING PLANNING SYSTEM

FIELD OF THE INVENTION

The present invention relates to manufacturing planning systems, and more particularly, to a method of accounting for equipment constraints in a manufacturing planning system.

BACKGROUND OF THE INVENTION

A typical manufacturing planning system considers data pertaining to fabrication process route, production capacity constraints, material constraints, shop status, work-in-progress (WIP) status, customer orders, priority, and management objectives. In response to these inputs, the planning system outputs manufacturing goals and objectives and other related information including, without limitation, plan finish date, capacity plan, bottleneck equipment identification, scheduling sequence, and production start and finish times. In doing so, the planning system balances demand (customer orders) and supply (WIP) and determines work order sizing if demand is larger than supply.

As is well known in the art, virtually every tool, machine, or other equipment used in a manufacturing process has its own set of operating tolerances. Thus, when multiple, close tolerance processing stages are performed on a lot of material using different tools or machines, critical dimensions of the product may fall outside the allowable limits of the product's specification, thereby requiring re-work which may negatively impact product yield and productivity.

Hence, the same tool or machine may be assigned to perform close tolerance processing stages. This type of equipment restriction or constraint is typically implemented in daily manufacturing scheduling, but, is not considered in the manufacturing planning system. For this reason, the capacity of the tool or machine is often overestimated by the planning system, which causes the tool or machined to become a bottleneck in the manufacturing process.

Accordingly, a method is needed to account for equipment utilization constraints in a manufacturing planning system

SUMMARY OF THE INVENTION

The invention disclosed herein is a method of accounting for manufacturing resource re-entry constraints in a manufacturing planning system. In the method a relationship is built from a manufacturing operation to be rendered on lots of material, to a plurality of manufacturing resources capable of performing the operation. This may be accomplished by assigning a first group of manufacturing resources to the operation which are each capable of performing the operation. A second group manufacturing resources each capable of performing the operation is also assigned to the operation, wherein each of the manufacturing resources of the second group have its re-use in performing the operation on the same lot of material constrained to ones of the lots of material requiring the operation to be performed with close tolerances. For a selected lot of material, any of the manufacturing resources of the first group may be selected for performing the operation if the selected lot of material does not require the operation to be performed with close tolerances. If however, the selected lot of material requires the operation be performed with close tolerances, then a manufacturing resources is selected from the second group of manufacturing resources.

DETAILED DESCRIPTION OF THE INVENTION

Figure 1:
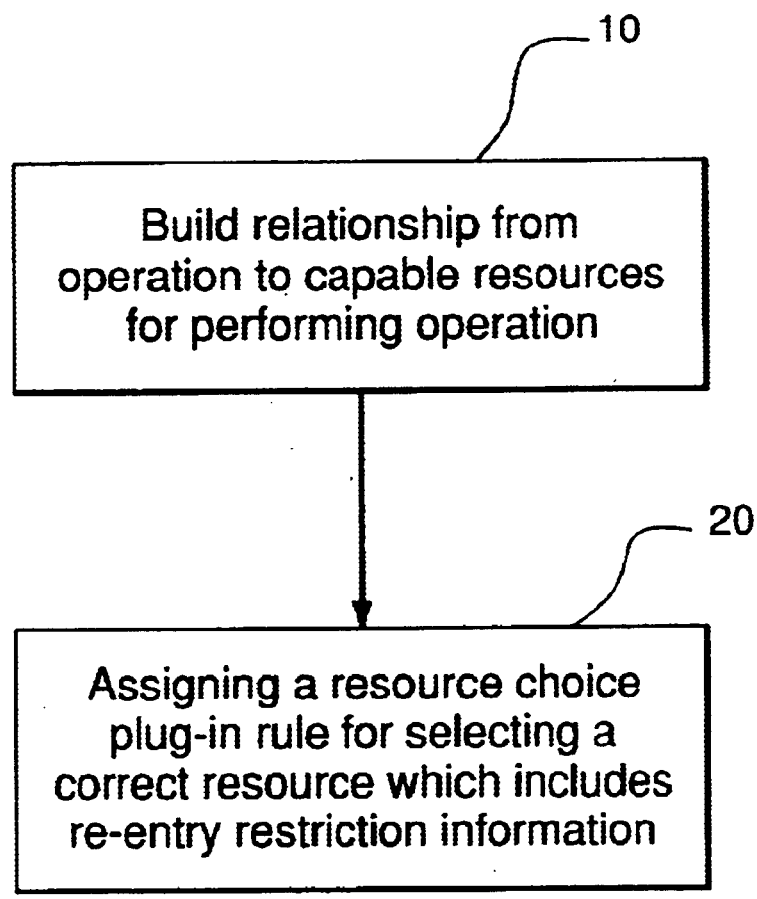
FIG. 1 is a flow chart of the method of the present invention.

The present invention is a method of accounting for equipment re-entry constraints in a production planning system. As shown in FIG. 1, the method generally includes for each manufacturing process or operation, the step 10 of building a relationship from operation to capable resources (e.g., tools, machine, equipment, etc.) for performing the operation, and the step 20 of assigning a resource choice plug-in rule for selecting a correct one of the resources, which includes re-entry restriction information.

Figure 2:
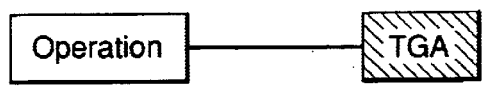
FIGS. 2–7 are functional block diagrams detailing the steps of the method.

Referring to FIG. 2, the relationship from operation to the resources may be constructed by assigning, for each manufacturing operation, an identifier to a tool group alternative (TGA). Tool group alternative defines the relationship between the a manufacturing process step or operation and the capable resource or tool groups for performing that operation wherein a tool group is defined as a group of tools that have the same or similar process capabilities or characteristics.

Figure 3:
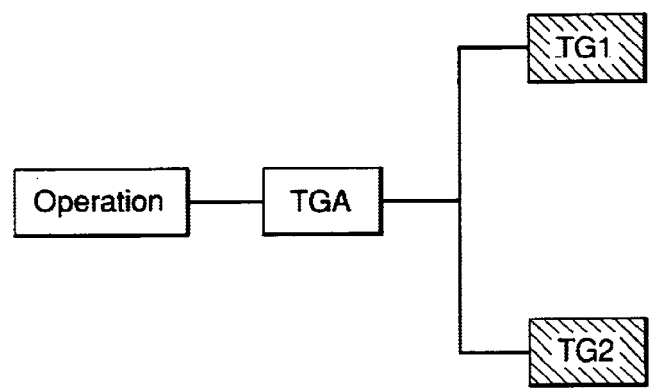

Referring to FIG. 3, two or more tool groups are assigned to the TGA of each operation. In the illustrated embodiment of FIG. 4, two tools TG1 and TG2 have been assigned to TGA. Tool group TG1 may be an original tool group, i.e., the group of tools whose capabilities or characteristics do not consider or account for tool re-entry constraints or restrictions. Tool group TG2 may be a new tool group which only considers tool re-entry constraints or restrictions.

Figure 4:
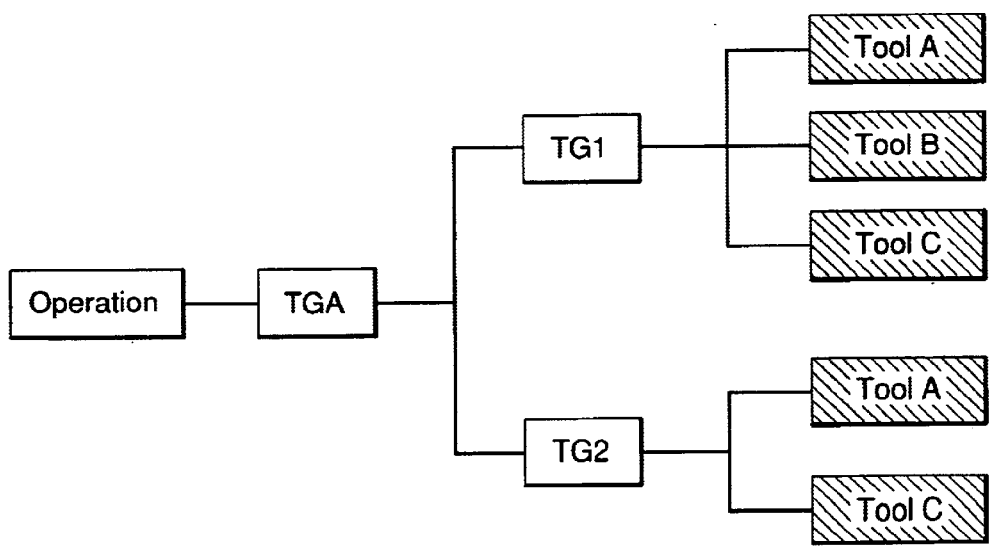

Referring to FIG. 4, resources, such as tools or equipment, which are capable of performing the process step or operation, are assigned to each tool group assigned to TGA. Tools A, B, and C are assigned to the original tool group TG1, i.e., the tool group whose capabilities do not consider tool re-entry constraints, and tools A and C are assigned to the new tool group TG2, i.e., the tool group which only considers tool re-entry constraints.

Figure 5:
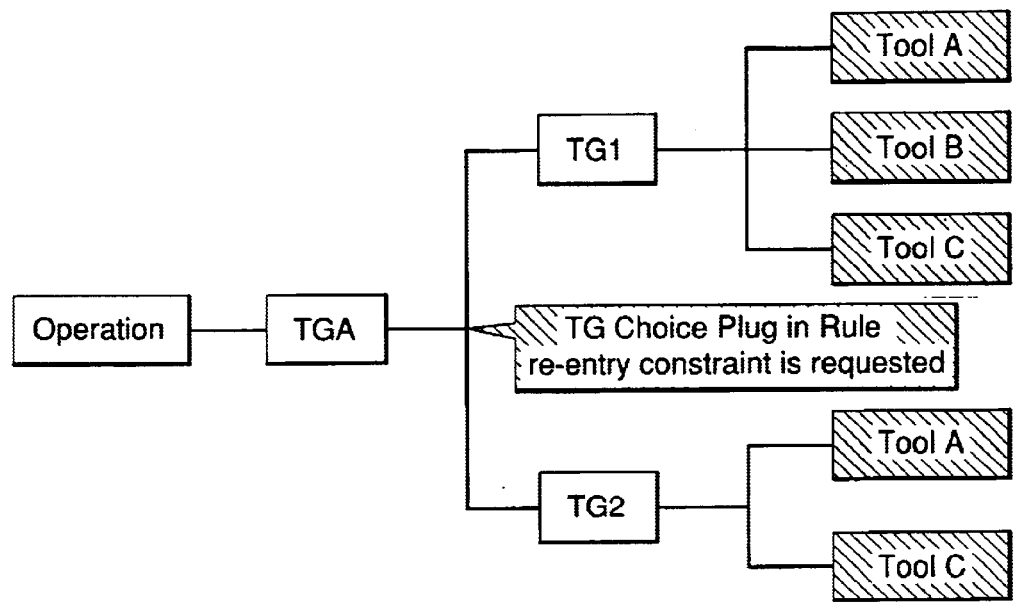

Referring to FIG. 5, for the TGA of each operation, a tool group choice plug-in rule (plug-in rule) is provided for selecting the correct tool group, which includes re-entry restriction information. The plug-in rule is assigned as one of the attributes of the TGA.

Referring still to FIG. 5, the operation of the plug-in rule will now be described for assigning the correct tool group and tool to a selected lot of material (e.g., wafers) to be processed in the operation-when re-entry constraint is requested for the lot. For the TGA corresponding to the lot, the plug-in rule "re-entry constraint is requested," is assigned as one of the attributes of the TGA.

Figure 6:
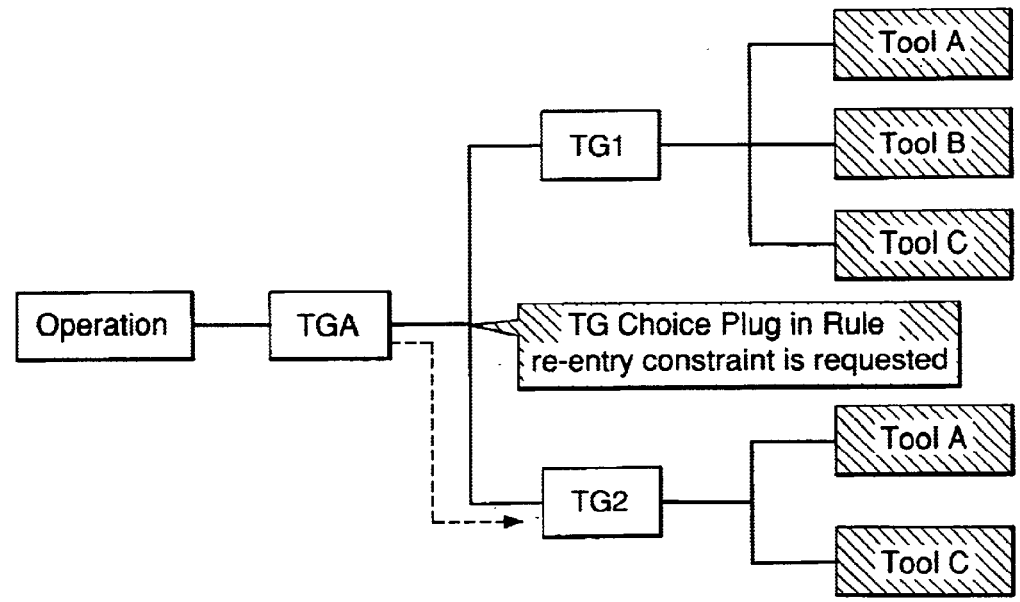

In FIG. 6, the request for re-entry constraint causes the selection of TG2, i.e., the tool group which only considers tool re-entry constraints.

Figure 7:
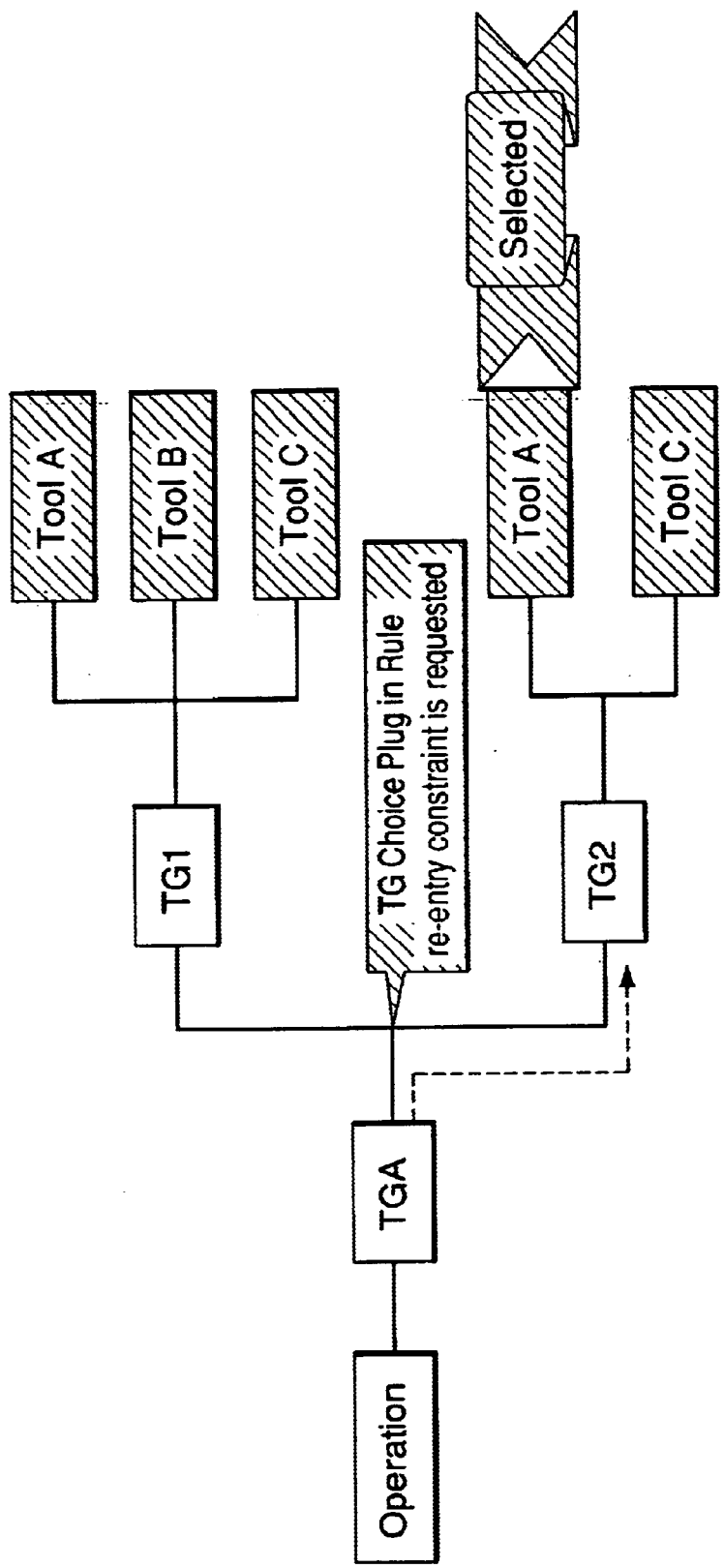

In FIG. 7, the lot is assigned to Tool A after considering both tool loading balance and earliest finish time. More specifically, the tool re-entry constraint result is considered along with other factors or variables including without limitation fabrication process route, production capacity constraints, material constraints, shop status, work-in-progress (WIP) status, customer orders, priority, and management objectives by the production planning system in balancing demand (customer orders) and supply (WIP), and determining work order sizing if demand is larger than supply. Tool re-entry constraint and the other factors are also considered by the planning system in determining the sequence of scheduling and finding production start times and finish times. Hence, after considering tool re-entry constraint and the other factors, the planning system outputs the assignment of Tool C to the lot and other items including without limitation plan finish date, capacity plan and bottleneck equipment identification.

While the foregoing invention has been described above with reference to one or more embodiments, various modifications and changes can be made without departing from the spirit of the invention. Accordingly, such modifications and changes are considered to be within the scope of the appended claims.

What is claimed is:

1. In a manufacturing planning system for managing production of multiple lots of material where a manufacturing operation is to be performed at least twice on each lot of material, a method of accounting for manufacturing resource re-use constraints, the method comprising the steps of:

assigning a first group of manufacturing resources to the operation which are each capable of performing the operation;

assigning a second group of manufacturing resources to the operation which are each capable of performing the operation, each of the manufacturing resources of the second group having its re-use in performing the operation on a same lot of material constrained to ones of the lots of material requiring the operation to be performed with close tolerances;

selecting one of the lots of material;

wherein if the selected lot of material does not require the close tolerances, selecting one of the plurality of manufacturing resources from the first group for each performance of the operation;

wherein if the selected lot of material requires the close tolerances, selecting one of the plurality of manufacturing resources from the second group for each performance of the operation.

2. The method according to claim 1, wherein each resource comprises a different tool.

3. The method according to claim 2, wherein the tool comprises photolithographic equipment.

4. The method according to claim 1, wherein each resource comprises equipment.

5. The method according to claim 4, wherein the equipment comprises photolithographic equipment.

6. The method according to claim 1, further comprising the step of assigning the selected lot to the selected resource.

7. The method according to claim 6, wherein the selected lot is assigned to the selected resource if predetermined loading balance and earliest finish time constraints are met.

8. The method according to claim 1, wherein the second group of manufacturing resources is a subset of the first group of manufacturing resources.

* * * * *